US005593030A

United States Patent [19]
Tell

[11] Patent Number: 5,593,030
[45] Date of Patent: Jan. 14, 1997

[54] COMPACT DISC HOLDER

[76] Inventor: Richard B. Tell, 3216 Selby Ave., Los Angeles, Calif. 90034

[21] Appl. No.: 444,444

[22] Filed: May 19, 1995

[51] Int. Cl.$^6$ .................................................. B65D 85/57
[52] U.S. Cl. .................................... 206/308.1; 206/310
[58] Field of Search .................................... 206/307–313, 206/308.1, 391, 392, 394, 493; 229/406, 407

[56] References Cited

U.S. PATENT DOCUMENTS

| | | | |
|---|---|---|---|
| 2,600,023 | 6/1952 | Rice | 206/310 |
| 2,663,416 | 12/1953 | Hirsch . | |
| 3,109,539 | 11/1963 | Turoff . | |
| 3,998,324 | 12/1976 | Roccaforte | 206/493 |
| 4,049,120 | 9/1977 | Bower | 206/303 |
| 4,120,398 | 10/1978 | Braddon, Sr. | 206/391 |
| 4,674,632 | 6/1987 | Friedman . | |
| 4,709,812 | 12/1987 | Kosterka . | |
| 4,718,553 | 1/1988 | Adamoli et al. . | |
| 4,718,557 | 1/1988 | Friedman . | |
| 4,874,085 | 10/1989 | Grobecker et al. . | |
| 4,941,575 | 7/1990 | Friedman . | |
| 4,972,953 | 11/1990 | Friedman et al. . | |
| 4,982,846 | 1/1991 | Friedman . | |
| 5,085,318 | 2/1992 | Leverick . | |
| 5,186,327 | 2/1993 | McCafferty et al. . | |
| 5,188,229 | 2/1993 | Bernstein . | |
| 5,188,230 | 2/1993 | O'Brien et al. . | |
| 5,205,405 | 4/1993 | O'Brien et al. . | |
| 5,219,417 | 6/1993 | O'Brien et al. . | |
| 5,248,032 | 9/1993 | Sheu et al. . | |
| 5,307,927 | 5/1994 | Curtis et al. . | |
| 5,332,089 | 7/1994 | Tillett et al. . | |
| 5,333,728 | 8/1994 | O'Brien et al. . | |
| 5,333,732 | 8/1994 | Budny et al. . | |
| 5,335,770 | 8/1994 | Baker et al. . | |

OTHER PUBLICATIONS 1 compact disk holder by Adobe Systems Incorporated entitled "Adobe Type Library".
1 compact disk holder, plain, which is called a "jewel box".
1 compact disk holder by AGI DIGI PAK entitled "4 Panel".
1 compact disk holder by Poly–Matrix entitled "poly–flex box".

Primary Examiner—Jimmy G. Foster
Attorney, Agent, or Firm— Knobbe, Martens, Olson & Bear

[57] ABSTRACT

A compact disk holder for storing a compact disk. The holder can be molded as a single piece from pulp fiber material made from recycled paper products. The holder features a panel having a hub with an inner cavity allowing the hub to elastically deform radially inwardly to releasably hold a disk by its mounting hole.

20 Claims, 3 Drawing Sheets

COMPACT DISC HOLDER

BACKGROUND OF THE INVENTION

This invention relates to packaging for compact disks and, more specifically, to a compact disk holder for storing a compact disk within an outer compact disk box or folder.

A compact disk is a 4.7 inch diameter metal record containing laser-readable information, such as music, computer software or multimedia. In recent years, the compact disk has become perhaps the leading recording medium for the distribution of music to the general public. Because the compact disk has become so popular, and in light of the increased environmental awareness that now pervades our society, much attention has been focused on compact disk packaging, which in general has been criticized for not being environment friendly.

One of the main objects of this criticism has been the book-like compact disk boxes made from plastic, a generally non-recyclable raw material. This type of compact disk box has a front panel, a rear panel, and a compact disk holder located therebetween. The front and rear panels are foldably connected along one edge to allow the compact disk box to open like a book. The compact disk holder is attached to the rear panel and provides a circular recess to accept the compact disk. At the center of the circular recess, a plastic hub is formed in the disk holder. There are currently several available hub designs. One common hub design comprises an arrangement of elastic fingers that snap through a hole in the center of the compact disk to hold the compact disk in the recess. Accordingly, when a user opens the front panel of the compact disk box to remove a compact disk, the engagement between the central hub and the center hole of the compact disk retains the compact disk within the holder and prevents the compact disk from falling out. The user can remove the compact disk by grabbing its edges and pulling it away from the hub's fingers, which yield elastically. Although compact disk boxes of this general configuration have been satisfactory for their intended purpose, the plastic materials from which they are made are not environment friendly.

One attempted solution to the environmental problems associated with using plastic materials for compact disk boxes is reflected in another compact disk box comprising two or more panels made of paper products that fold up in a wallet-like fashion to enclose a compact disk. However, this type of compact disk box still utilizes an injection-molded plastic disk holder mounted to one of the panels to hold the compact disk within the box. This disk holder is similar in size and construction to the disk holder of the all-plastic compact disk box, discussed above, and both share the same center hub with elastic plastic fingers to engage the compact disk center hole. While the panels of the box can be constructed from recycled paper products, the disk holder's elastic fingers are still constructed of plastic.

Therefore, it is apparent that a need has existed for a compact disk box, holder or tray that is more environment friendly, while still retaining the advantages of the plastic and paper-plastic compact disk boxes or folders. The present invention satisfies these needs and provides further related advantages.

SUMMARY OF THE INVENTION

The present invention provides a compact disk holder for storing a compact disk. The disk holder features a central hub having a unique structural arrangement that permits the hub to elastically and releasably engage a center hole of the compact disk. Moreover, the entire disk holder can be made as a single molded unit from recyclable materials, such as pulp fiber, which may be derived at least in part from recycled paper products. This overall combination significantly minimizes the environmental impact when the disk holder is discarded or recycled.

In one embodiment of the invention, the disk holder comprises a pulp fiber panel having side edges, a base surface and a central hub. The hub has a curved sidewall and a raised top wall that define a cavity or hollow space under the hub. The sidewall extends upwardly from the base surface to the raised top wall. The sidewall is configured to frictionally engage the mounting hole of the compact disk. When the disk mounting hole is aligned around the hub's top wall and is moved downwardly toward the base surface of the panel, the elastic properties of the sidewall allow the hub to deflect radially inward and frictionally hold the disk. An advantage of the invention is that the elastic hub, having this configuration, can be constructed of recycled material, thereby allowing the entire disk holder to be made of recycled material.

In one embodiment of the invention, the hub has a slot that extends diametrically across the hub. In another embodiment, the hub has a cup-shaped configuration and comprises an annular sidewall that is open at the top but not at the bottom. Other embodiments of the hub include a cup-shaped configuration that is open at both the top and the bottom, as well as a related version that has one or more notches in the annular sidewall.

In one aspect of the invention, the disk holder comprises a one-piece molded construction made entirely of pulp fiber. Alternatively, the disk holder's components can be molded separately from pulp fiber or other suitable paper-like materials, and then these components can be secured together using adhesives to still yield an all-paper construction. By making the entire disk holder from pulp fiber, the resulting product is highly desirable because of its use of recycled material, which helps preserve the environment.

Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

The accompanying drawings illustrate the invention. In such drawings.

DESCRIPTION OF THE PREFERRED EMBODIMENT

Figure 1:
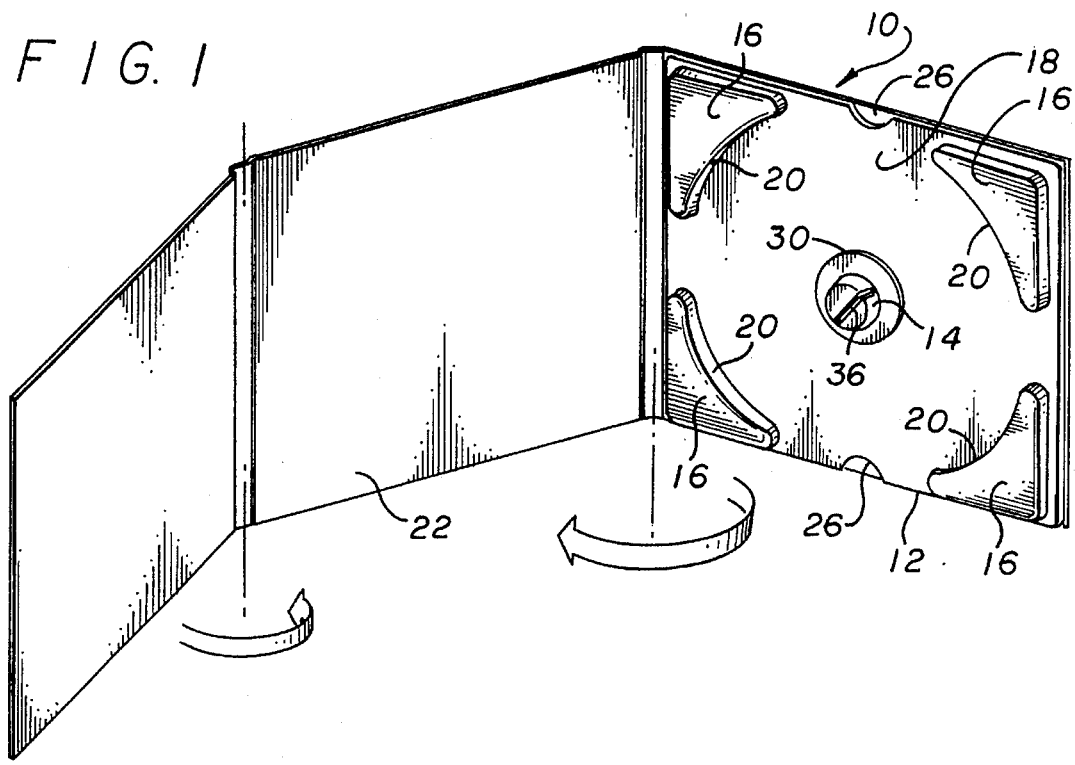
FIG. 1 is a perspective view of a compact disk storage folder having a compact disk holder embodying the novel features of the present invention.

As shown in the exemplary drawings, the present invention is embodied in a compact disk holder, generally referred to by the reference numeral 10, for use in storing a compact disk (not shown) in a box, folder or other surrounding compact disk storage structure. The disk holder 10 comprises a panel 12 with a central hub 14 and four alignment islands or ridges 16 surrounding the hub. The hub 14 aligns and holds the compact disk in a circular disk space 18 defined by the inner facing edges 20 of the ridges 16. In accordance with the invention, the compact disk holder 10 preferably is a one-piece structure molded from pulp fiber derived from recycled paper products, as will be described in more detail below.

FIG. 1 is a perspective view of the compact disk holder 10 mounted to a conventional three-panel folder 22 similar to that sold under the brand name DIGI-PAK by AGI Incorporated of Melrose Park, Ill. Adhesives or other appropriate fastening mechanisms can be used to mount the disk holder to the three-panel folder 22, as is well known in the art. Although the three panel folder is illustrated, it should be appreciated that the disk holder 10 can be incorporated into other types of compact disk boxes or folders having enough interior space to accommodate the disk holder.

Figure 2:
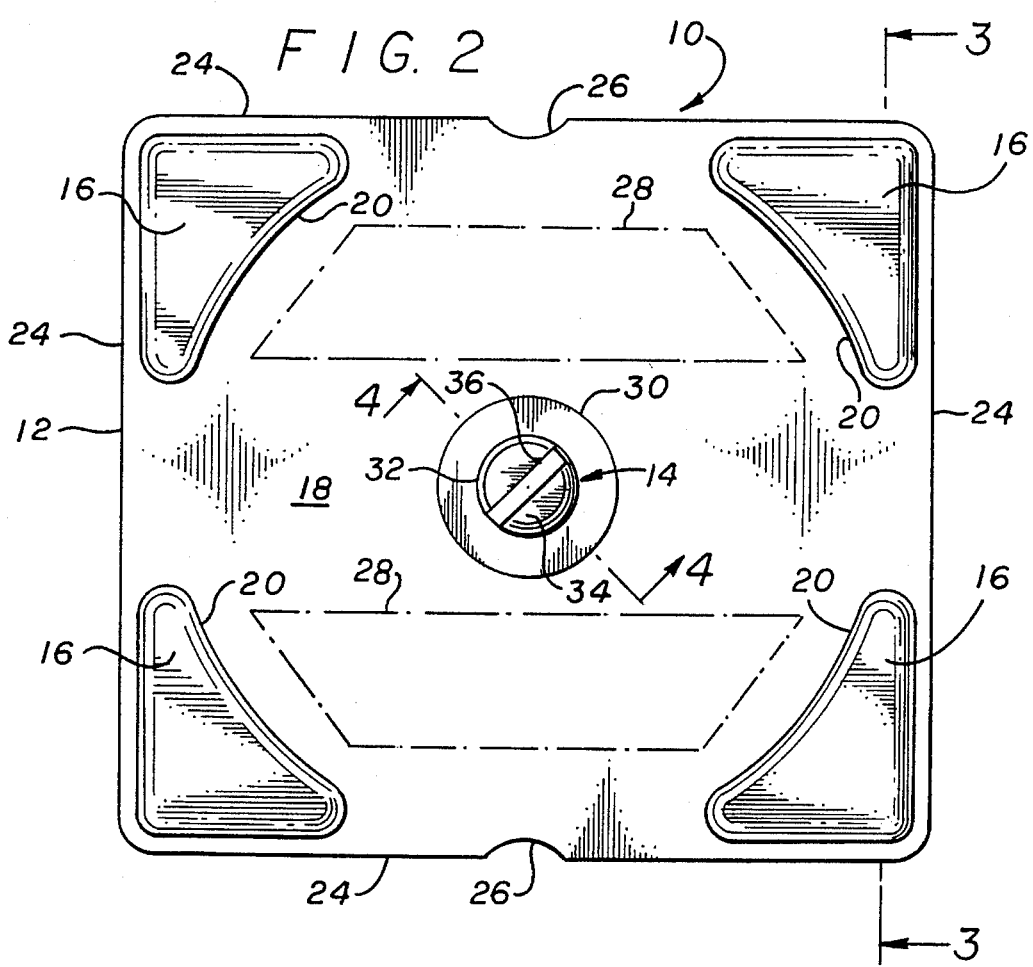
FIG. 2 is an enlarged front view of the compact disk holder shown in FIG. 1.

FIG. 2 is a front view of the compact disk holder 10. The panel 12 of the disk holder 10 is generally rectangular and has four side edges 24 with two finger cut-outs 26 located on opposite sides of two of the panels. Each ridge 16 is located in an corner of the panel 12 and functions to increase the disk holder's rigidity, in addition to providing stabilizing support for the compact disk. The hub 14 is located at the center of the panel 12.

Figure 3:
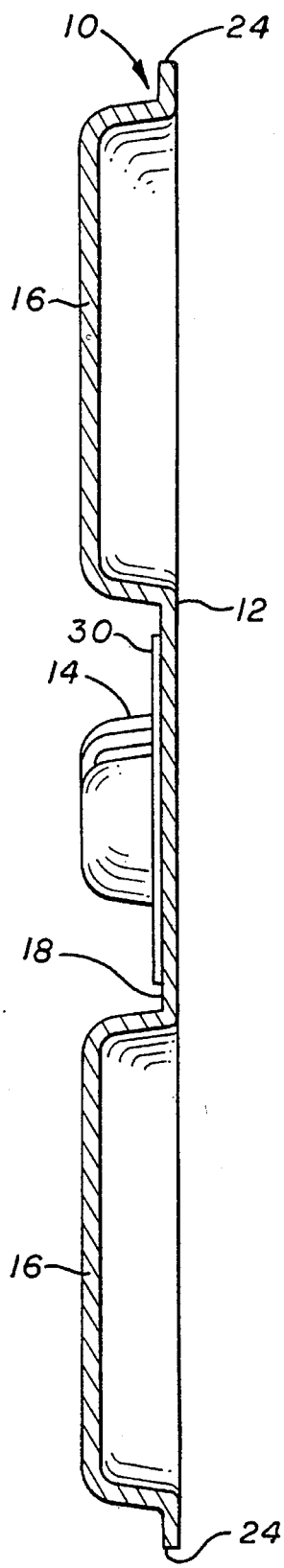
FIG. 3 is a cross-sectional view of the compact disk holder, taken substantially along line 3—3 of FIG. 2.

As shown best in FIG. 3, the ridges comprise hollow, raised portions of the panel 12 that are about 0.2–0.4 inch high. The circular disk space 18 defined by the inner facing edges 20 of the ridges 16 includes two debossing areas 28 where advertising or other text or designs can be molded into the panel 12, if desired. An elevated circular spacer or rest 30 is located around the hub 14 to space the disk from the surface of the panel 12 when the disk is held on the hub. The elevated rest 30 is optional and would not be needed, for example, if spacing of the disk from the surface of the panel 12 is not desired.

Figure 4:
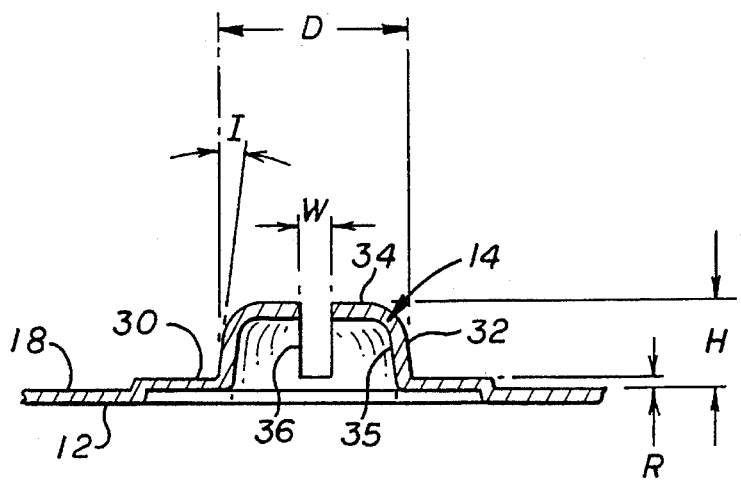
FIG. 4 is a cross-sectional view of one embodiment of a central hub of the compact disk holder, taken substantially along line 4—4 of FIG. 2.

FIG. 4 is a detailed cross-sectional view of one embodiment of the hub 14. The hub 14 is generally cylindrical and has an inclined circumferential sidewall 32 that projects up from the rest 30 and curves in a horizontal direction to meet a substantially horizontal top wall 34. The sidewall 32 and the top wall 34 together define a hollow space or cavity 35 under the hub 14.

A slot 36 extends diametrically through the hub 14 in a diagonal direction aligned between two ridges 16 on diagonally opposing corners of the holder 10. This diagonal alignment of the slot 36 minimizes the weakening effect of the slot 36 on the hub 14 that would normally occur, as would be expected upon the removal of material from any structure. The diagonal alignment of the hub 14 also has a corresponding effect on the panel 12 that minimizes any weakening and thereby reduces the likelihood that the panel may fold up along the slot 36 from handling or during production.

The slot 36 advantageously allows the hub 14 to elastically deform radially inward when the center hole of the compact disk is placed around the top wall 34 of the hub and is moved downwardly toward the surface of the panel 12. This elastic deformation allows the hub 14 to releasably engage the compact disk via its center hole.

Figure 5:
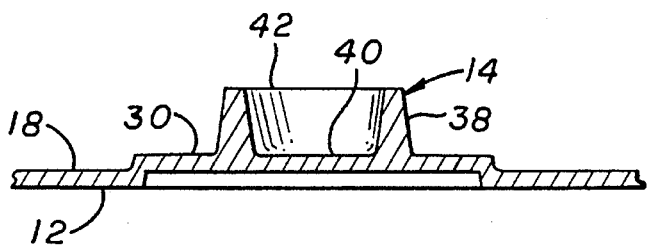
FIG. 5 is a cross-sectional view of another embodiment of a central hub of the compact disk holder.

FIG. 5 shows a cross-sectional view of another embodiment of the hub 14. In this embodiment, the hub 14 has an annular sidewall 38 with a bottom wall 40. The annular sidewall 38 and bottom wall 40 together form a cup-shaped depression that has an opening 42 at the top. This configuration allows the hub 14 to deform elastically in a radial direction to releasably hold the center hole of the compact disk.

Figure 6:
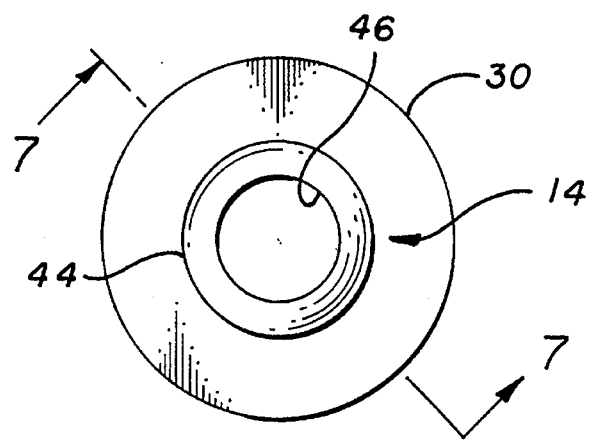
FIG. 6 is an enlarged front view of another embodiment of a central hub of the compact disk holder.
Figure 7:
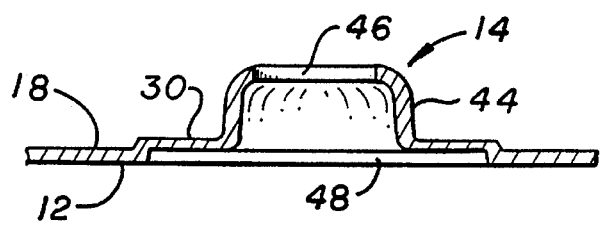
FIG. 7 is a cross-sectional view of the central hub taken substantially along line 7—7 of FIG. 6.

FIGS. 6–7 show another embodiment of the hub 14. This embodiment is similar to the embodiments of the hub shown in FIGS. 4–5 above, in that the hub 14 of FIGS. 6–7 also has an annular sidewall 44 similar to the hub of FIG. 4, yet it is open at the top like the hub of FIG. 5. However, the hub of FIGS. 6–7 does not have a bottom wall and, therefore, has both a top opening 46 and a bottom opening 48. This configuration allows the hub 14 to deform elastically in a radial direction to releasably hold the center hole of the compact disk.

Figure 8:
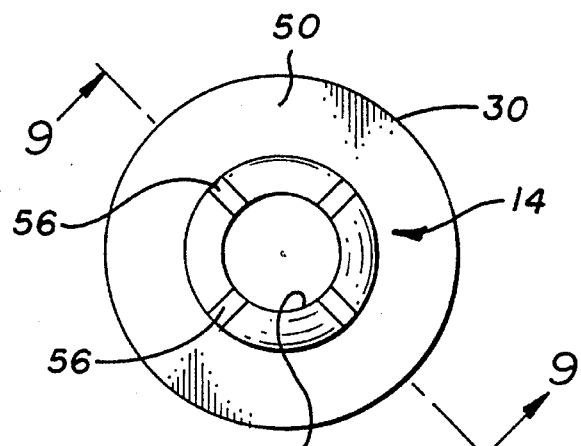
FIG. 8 is an enlarged front view of another embodiment of a central hub of the compact disk holder.
Figure 9:
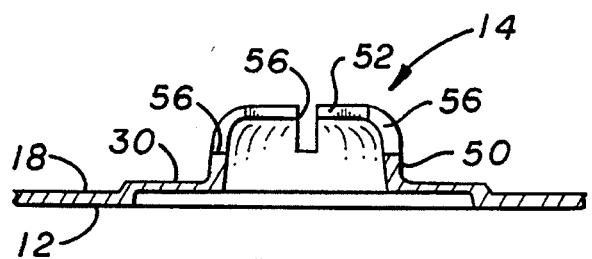
FIG. 9 is a cross-sectional view of the central hub taken substantially along line 9—9 of FIG. 8.

FIGS. 8–9 show another embodiment of the hub 14. This embodiment of the hub 14 is similar to the embodiment of the hub shown in FIGS. 6–7 discussed above. Thus, the hub 14 has an annular sidewall 50 with a top opening 52 and a bottom opening 54. However, the hub 14 also has one or more notches 56 in the annular sidewall 50. These notches 56 extend about half way down the sidewall 50 from the top opening 52. There are four notches 56 equally spaced from each other in the sidewall 50 of the hub 14. It will be appreciated, however, that fewer or more notches 56 may be used to achieve the proper elasticity of the hub 14. Like the other embodiments of the hub 14 discussed above, the configuration of the hub shown in FIGS. 8–9 allows the hub to deform elastically in a radial direction to releasably hold the center hole of the compact disk.

The dimensions of the various features of the first embodiment of the hub 14 will now be discussed. As shown in FIG. 4, dimension D is the diameter of the base of the hub 14, which is preferably equal to or between about 0.57 and 0.59 inches. Dimension H is the height of the hub 14, which is preferably about 0.25 inch. Angle I is the angle of inclination of the sidewall 32 of the hub 14, which is preferably between about 2–7 degrees from a line drawn perpendicular to the surface of the panel 12. Dimension W is width of the slot 36, which is at least about 0.006 inch, but could be about 0.13 inch or more. Dimension R is the height of the rest 30, which is preferably between about 0.06 to 0.12 inch. It should be appreciated that the above-identified dimensions may vary according to the specific properties of the pulp fiber used to make the disk holder 10, as well as other considerations related to manufacture and use. Therefore, these dimensions have been provided for purposes of illustration only and not by way of limitation.

The compact disk holder 10 of the present invention preferably is constructed from molded pulp fiber principally made from recycled paper products and water. Pulp fiber manufacturing processes have been used in the past, for example, to make egg cartons of the type found in most supermarkets. U.S. Pat. No. 5,335,770 describes packaging structures made from pulp fiber using such a process and is incorporated herein by reference. Moulded Fiber Technology, Inc. of Westbrook, Me. also provides services in connection with manufacturing products from pulp fiber. Therefore, since these processes are known, they will not be described in detail. In general, however, the recycled paper products forming the pulp fiber composition comprise approximately 75% recycled newspaper and approximately 25% recycled office paper, although other suitable combinations and ingredients can be used. Once the pulp fiber is formed and dried, the pulp fiber has a relatively low moisture content and is itself substantially biodegradable and recyclable.

The compact disk holder 10 can be manufactured using known vacuum forming and molding processes, such as those available from Moulded Fibre Technology, Inc. The pulp fiber is first drawn into a forming station where molds corresponding to the configuration of the disk holder 10 are dipped into the pulp fiber. A vacuum is then drawn through the mold to form the pulp fiber into the shape of the compact disk holder. The formed disk holder 10 is then removed from the mold and dried. The formed disk holder 10 may also be subjected to a hot press operation to form a smoother, more commercially attractive finish on the top surface of the disk holder. A die cutter can be used to trim the edges 24 of the disk holder 10 or to separate the disk holders, if more than one holder is formed by each molding operation. The slot 36 may be formed during the molding, hot press or die cutting steps, or in other suitable ways.

Use of the compact disk holder 10 will be described with reference to FIGS. 1–4. To place a compact disk in the disk holder 10, a user holds the disk substantially parallel to the circular disk space 18 on the holder and aligns the center hole of the disk with the hub 14. The compact disk is then moved toward the holder 10, causing the disk hole to be received around the top wall 34 of the hub 14 and to slide down the inclined sidewall 32 of the hub toward the rest 30. The slot 36 allows the hub 14 to elastically deform radially inward in response to pressure from the compact disk center hole, whose diameter is slightly smaller than the diameter D of the hub. Because the hub 14 deforms elastically, it tends to be normally biased in a radially outward direction against the disk hole to snugly hold the disk within the disk holder during storage. To remove the disk, the user places his or her fingers on the edge of the disk where the finger cutouts 26 are formed in the panel 12. The user can thus grip the disk and pull it away from the hub 14, which springs back to its original position after the disk has been removed.

From the foregoing, it will be appreciated that the present invention provides a disk holder 10 having an elastic hub 14 that can be made from environmentally friendly materials, such as pulp fiber made from recycled paper products. Because recycled components can be used, many millions of the compact disk holders can be made without consuming the natural resources required to make conventional plastic compact disk holders.

While a particular form of the invention has been illustrated and described, it will be apparent that various modifications can be made without departing from the spirit and scope of the invention. Accordingly, it is not intended that the invention be limited, except as by the appended claims.

I claim:

1. A disk holder for holding a disk having a mounting hole, comprising:

a substantially planar panel and a hub projecting outwardly from the panel, both the panel and the hub being comprised of paper material, wherein the hub comprises a substantially annular sidewall that projects outwardly from the panel and curves radially inward terminating in a raised top wall, the sidewall and the top wall together defining a cavity under the hub, whereby the hub is adapted to elastically deform radially inward and releasably hold the disk when the hub is received through the mounting hole.

2. The disk holder of claim 1, further comprising a slot formed in the top wall and at least a portion of the sidewall.

3. The disk holder of claim 1, wherein the paper material comprises pulp fiber.

4. The disk holder of claim 3, wherein the disk holder comprises a one-piece construction.

5. The disk holder of claim 1, wherein the disk holder is molded in a one-piece construction comprised entirely of pulp fiber.

6. The disk holder of claim 1, wherein the annular sidewall has an opening in the top wall and further comprises a bottom wall substantially closing a bottom portion of the sidewall.

7. The disk holder of claim 1, wherein the annular sidewall has an opening in the top wall and further includes an opening at a bottom portion of the sidewall.

8. The disk holder of claim 1, wherein the annular sidewall has an opening in the top wall and further includes an opening at a bottom portion of the sidewall, and a plurality of notches in the sidewall adjacent the top opening.

9. The disk holder of claim 8, wherein there are four notches spaced equally from each other around the sidewall.

10. A disk holder for holding a compact disk having a mounting hole, wherein the disk holder is constructed entirely from paper material, the disk holder comprising:

a substantially planar panel and a hub projecting outwardly from the panel, wherein the hub comprises an elastically deformable annular sidewall that extends radially about an axis transverse to the planar panel and curves radially inward terminating in a raised top wall, with a slot extending diametrically across the hub, the sidewall and the top wall defining a cavity under the hub such that, in cooperation with the slot, the hub is adapted to exhibit elastic properties and deform radially inward to pass through the disk mounting hole and releasably hold the disk.

11. The disk holder of claim 10, wherein the disk holder is molded entirely from paper material into a one-piece construction.

12. A disk holder for holding a compact disk having a mounting hole, wherein the disk holder is constructed entirely from paper material, the disk holder comprising:

a substantially planar panel and a hub projecting outwardly from the panel, wherein the hub comprises an elastically deformable annular sidewall that tapers radially inward, the sidewall having a bottom end connected to the panel and a top end extending outwardly from the panel, wherein the top end of the sidewall has an opening and the bottom end of the sidewall is substantially closed by a bottom wall, the sidewall defining a space within the hub such that the sidewall is adapted to exhibit elastic properties and to elastically deform radially inward to pass through disk mounting hole and to releasably hold the disk.

13. The disk holder of claim 12, wherein the disk holder is molded entirely from paper material into a one-piece construction.

14. A disk holder for holding a compact disk having a mounting hole, wherein the disk holder is constructed entirely from paper material, the disk holder comprising:

a substantially planar panel and a hub projecting outwardly from the panel, wherein the hub comprises an elastically deformable continuous annular sidewall having a bottom end connected to the panel and a top end extending outwardly from the panel, wherein the hub has an opening at the top end that has a diameter smaller than an opening at the bottom end, the sidewall defining a space within the hub such that the sidewall is adapted to exhibit elastic properties and deform radially inward to pass through the mounting hole and to releasably hold the disk.

15. The disk holder of claim 14, wherein the disk holder is molded entirely from paper material into a one-piece construction.

16. A disk holder for holding a compact disk having a mounting hole, wherein the disk holder is constructed entirely from paper material, the disk holder comprising:

a substantially planar panel and a hub projecting outwardly from the panel, wherein the hub comprises an elastically deformable sidewall having a bottom end connected to the panel and a top end extending outwardly from the panel, and a plurality of notches in the sidewall at the top end of the sidewall, the sidewall defining a space within the hub such that the sidewall is adapted to exhibit elastic properties and deform radially inward to pass through the disk mounting hole and to releasable hold the disk.

17. The disk holder of claim 16, wherein the disk holder is molded entirely from paper material into a one-piece construction.

18. The disk holder of claim 16, wherein there are four notches spaced equally from each other around the top end of the sidewall.

19. A compact disk holder for holding a compact disk having a mounting hole, comprising:

a substantially planar panel and a hub sized to releasably engage the compact disk at the periphery of its mounting hole, wherein the hub comprises an elastically deformable sidewall projecting outwardly from the panel, the sidewall comprising two semi-annular shell-like members spaced apart from each other by a slot, each of said members being adapted to deform radially inward such that said members can be received through the mounting hole and releasably hold the compact disk.

20. The compact disk holder of claim 19, wherein both the panel and the hub are molded out of paper material.

* * * * *